United States Statutory Invention Registration [19]

[11] Reg. Number: H653

Conrad [43] Published: Jul. 4, 1989

[54] SUPERCONDUCTING, SUPERDIRECTIVE ANTENNA ARRAY

[75] Inventor: Raymond W. Conrad, Russellville, Ala.

[73] Assignee: The United States of America as represented by the Secretary of the Army, Washington, D.C.

[21] Appl. No.: 219,546

[22] Filed: Jul. 15, 1988

[51] Int. Cl.[4] ..... H01Q 9/16

[52] U.S. Cl. ..... 343/792; 505/866

*Primary Examiner*—Stephen C. Buczinski
*Assistant Examiner*—Linda J. Wallace
*Attorney, Agent, or Firm*—Freddie M. Bush; James T. Deaton

[57] ABSTRACT

A superconducting, superdirective antenna array wherein a superconductive material is employed for the elements of the array which are arranged in a uniform half-wave dipole has low ohmic resistance and a very high radiation efficiency. The superdirective antenna array which is a linear array has element spacing less than λo/2 where λo is the center frequency of the dipoles. The material of the array elements has a very high critical current (i.e., and a critical magnetic field), a requirement for maximum efficiency. The superconducting, superdirective antenna array is housed in a vacuum insulated container and is provided outlet connecting to means for obtaining and sustaining a vacuum as required for element material of fabrication. The material of fabrication for the antenna array elements is selected from a type II superconductor material selected from the group consisting of iridiumm, lead, mercury, tantalum, vanadium, a composite of niobium-tin-bronze, and alloys of the same. The antenna array element material of fabrication, as fabrication techniques become available, can be a superconductive material selected from the ceramic oxides composition group consisting of $La_{2-x}Ba_x$ $CuO_x$ and $YBa_2Cu_3O_x$ wherein x is an integer and wherein the transition temperature ranges from about 30° K. to about 93° K., and the thallium-calcium-barium-copper oxide family of compounds with a transition temperature as high as 125° K. A dielectric window is employed for directing radiation of a very high directivity from the superconducting, superdirective antenna array.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

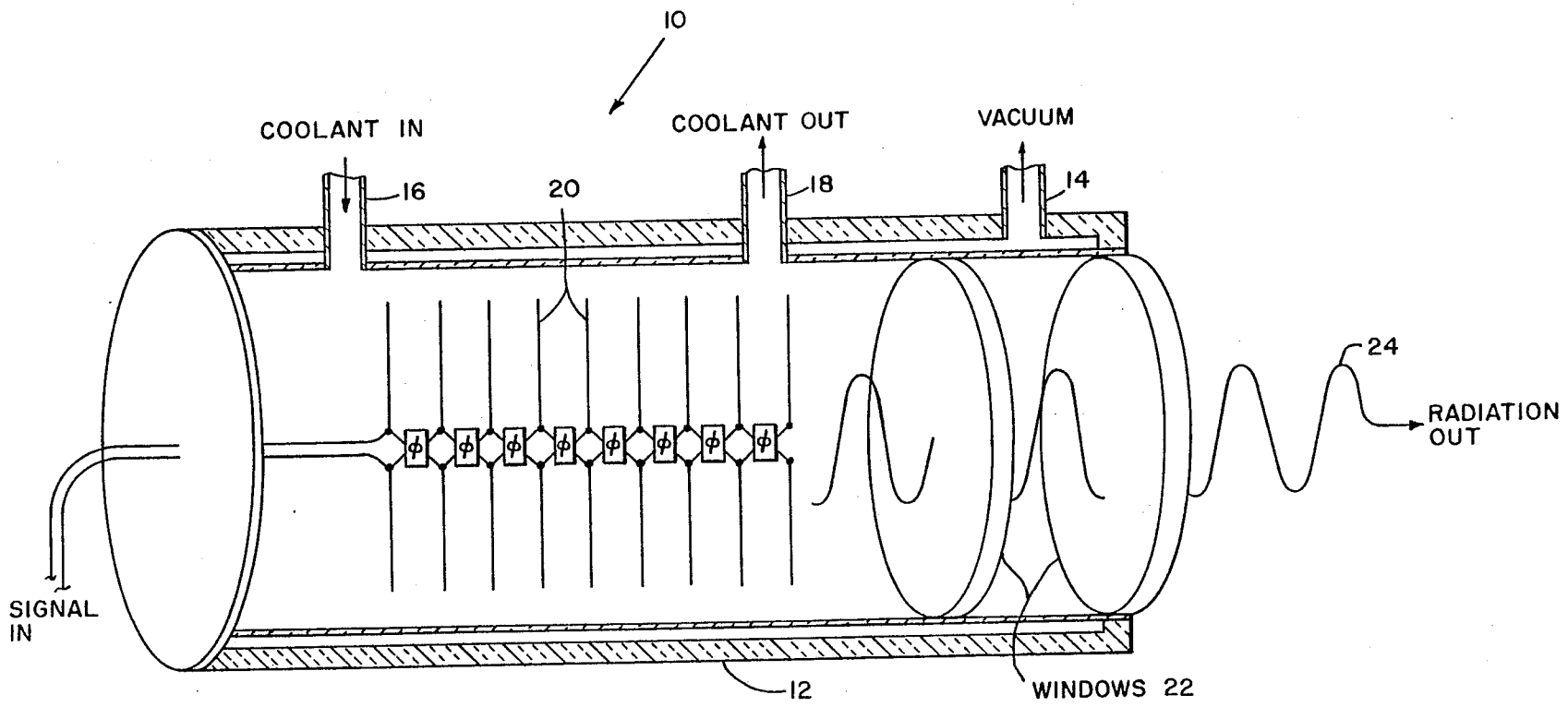
RADIATION OUT
24
WINDOWS 22
VACUUM
14
COOLANT OUT
18
12
10
20
COOLANT IN
16
SIGNAL IN

SUPERCONDUCTING, SUPERDIRECTIVE ANTENNA ARRAY

DEDICATORY CLAUSE

The invention described herein may be manufactured, used, and licensed by or for the Government for governmental purposes without the payment to me of any royalties thereon.

BACKGROUND OF THE INVENTION

Superdirective arrays, i.e., antenna arrays with element spacings significantly less than $\lambda_o/2$, where $\lambda_o$ is the resonant wavelength, have, in the past, not been practical to implement because the radiation resistance is generally small compared with the ohmic resistance. Also, very high currents are required to flow in the antenna elements, to achieve any significant amount of radiation.

Because of the essentiality of understanding the technical terms relating to directive antennas, selected pertinent terms will now be defined hereinbelow.

Radiation resistance is obtained by dividing the total radiated power of the antenna by the square of the effective antenna current measured at the point where power is supplied to the antenna.

Ohmic resistance is the opposition that a device or material offers to the flow of direct current, measured in ohms, kilohms, or megohms.

A lobe is one of the three-dimensional portions of the radiation pattern of a directional antenna. The direction of maximum radiation coincides with the axis of the major lobe. All other lobes in the patterns are called minor lobes.

Antenna power gain is a transmitting antenna rating equal to the square of the antenna gain, expressed in decibels.

Decreasing the value of the ohmic resistance would solve one of the major problems associated with achieving maximum radiation efficiency. Then the radiation resistance compared to the ohmic resistance would be at a value where superdirective arrays can become a practical reality as further projected below.

Thus, solving the problems relating to high ohmic resistance can result in very compact antennas. These antennas having high gain, low side lobes, and high directivity also have narrow beam widths. By way of example, a broadside array with 25 elements separated by $\lambda_o/24$, with length of $\lambda_o$, designed as a Chebyshev array with side lobes of 20 dB down would have a beam width of 13°.

A Chebyshev array, such as above, provides the design criteria for establishing the current distribution in the array elements which will produce a minimum beamwidth for a given sidelobe level. As one attempts to get enhanced directivity with element spacings $<(\lambda/2)$ for a given overall antenna dimension L, a large value of Q is the result, where Q is defined:

$$Q = \frac{\text{Reactive Power In Antenna}}{\text{Power Radiated From Antenna}}$$

The bandwidth of the antenna is $$BW \approx \frac{1}{Q} \text{ or } \frac{\text{Power Radiated from Antenna}}{\text{Reactive Power in Antenna}}$$

High gain or supergaining relative to an antenna results in a decreased bandwidth of the antenna. However, the trend in radar, missile guidance and communications links is toward wide bandwidth signals for: (1) enhanced channel capacity, (2) countermeasures hardening, or (3) improved detection and discrimination capability. A superconducting, superdirective antenna array with a very high radiation efficiency is highly desirable since it would have an extremely small bandwidth. Such an array as a high gain radiator of high power microwave or VHF (very high frequency) source which has high directivity is extremely important for weapons application.

Therefore, an object of this invention is to provide a superconducting, superdirective antenna array.

Another object of this invention is to provide a superconducting, superdirective antenna array with a very small bandwidth signal for communications which will be almost impossible to intercept with ordinary receivers.

A further object of this invention is to provide a superconducting, superdirective antenna array whereby the superdirective signal may be used as an active but covert radar, if doppler or range-doppler information only is required.

SUMMARY OF THE INVENTION

A superconducting, superdirective antenna array which employs a superconductive material for the elements has low ohmic resistance. The radiation resistance is insensitive to the nature of the element materials, so long as they are highly conductive, and since the radiation efficiency is related to the ratio of radiation resistance to ohmic resistance, then the radiator efficiency of the superconducting array is very high.

The superdirective antenna array has element spacing less than $\lambda_o/2$ where $\lambda_o$ is the center frequency of the dipoles. The material of the array elements has a very high critical current (i.e., and a critical magnetic field), a requirement for maximum efficiency. Thus, the superconductor material is selected for stability and ease of fabrication from a type II superconductor or from other superconductor materials having transition temperatures as high as 125° K. in accordance with availability of new fabrication techniques for these newly developed ceramic oxide materials. These ceramic oxide materials include lanthanum barium copper oxide ($La_{x-2}Ba_xCuO_4$) with a transition temperature over 30° K., the ceramic oxide $YBa_2Cu_3O_x$ with a transition temperature of about 93° K., and the thallium-calcium-barium-copper oxide family of compounds with transition temperature as high as 125° K.

BRIEF DESCRIPTION OF THE DRAWING

The single FIGURE of the drawing depicts elements fabricated of superconductive material for a uniform linear array of half-wave dipoles, separated by a distance $d<(\lambda_o/2)$ where $\lambda_o$ is the center frequency of the dipoles.

DESCRIPTION OF THE PREFERRED EMBODIMENT

A superconducting, superdirective antenna array with elements fabricated of superconductive material has a high radiation efficiency based on the ratio of radiation resistance to ohmic resistance. The radiation resistance is insensitive to the nature of the element materials, so long as they are highly conductive.

The superdirective antenna array of the single FIGURE of the drawing has element spacing less than ($\lambda_o/2$) where ($\lambda_o$) is the center frequency of the dipoles. The material of array elements has a high critical current (i.e., and a critical magnetic field), a requirement for maximum efficiency. For stability and ease of fabrication, a type II superconductor of niobium-tin, bronze is a preferred composite material for construction of the elements.

In further reference to the drawing, the single FIGURE depicts a superconducting, superdirective antenna array 10 with a very high radiation efficiency capability based on the ratio of radiation resistance to ohmic resistance. The highly conductive properties of the array elements render the radiation resistance insensitive to the nature of the element material so long as they are highly conductive.

Certain characteristics of superconductors are appropriately reviewed prior to providing further detailed description of the invention. Thus, the maximum limiting current is known as the critical current. Exceeding a superconductor's critical current could be quite catastrophic, since the return to the normal state produces large resistive heating which can damage the material. The ability to exclude a magnetic field from its interior, the ability to carry an electric current without resistance, and the ability to carry very large currents up to the critical current are the three basic characteristics of a superconductor.

The linear array of the single FIGURE of the drawing is shown as an example of the invention for simplicity. The superconducting, superdirective antenna array 10 is housed in a vacuum insulated container 12 provided with outlet 14 for connecting to means for obtaining and sustaining a vacuum as required (not shown). Outlets 16 and 18 are for "coolant in" and "coolant out" respectively, as may or may not be required depending upon the degree of superconductivity of materials selected. The antenna array is illustrated with a "signal in" coupled to array 20 as further defined below. A progressive phase shift $\zeta=2\pi d/\lambda_o$, where d is the element of spacing, is applied to each dipole in succession. This is indicated by the box labeled $\phi$ between dipoles. The progressive phase shift is achieved by techniques and devices well known by those skilled in the art. These techniques and devices can employ basic delay lines or more sophisticated components routinely used to change phase relation of alternating currents.

The choice of material type for the antenna array and configuration for the superconducting array elements is critical. Currents in the array elements can be extremely high. Therefore, a material with a very high critical current (i.e., critical magnetic field) is required for maximum efficiency. Also, operation at other than liquid helium temperatures is desirable. These two considerations plus a desire for stability and ease of fabrication indicate a type II superconductor. A niobium-tin, bronze composite operating at as low a temperature as possible is an example of a type II superconductor.

Other examples of type II material exhibiting superconductivity include iridium, lead, mercury, tantalum, and vanadium, and including many alloys of the same elements. Other superconductor material is selected from the new family of refractory metal oxides with critical temperatures above 77° K. Whichever material is used, a critical magnetic field of $10^7$A/M or more is desirable. This translates to a critical current of about $3\times10^5$A for a 1 cm diameter rod. For short pulse applications, operation above the critical current may be possible.

New family members of refractory metal oxide or ceramic oxides, such as lanthanum barium copper oxide ($La_{2-x}Ba_xCuO_4$) with a transition temperature over 30° K. and more recently, the ceramic oxide $YBa_2Cu_3O_x$ with a transition temperature of 93° K., and the thallium-calcium-barium-copper oxide family of compounds with a transition temperature as high as 125° K., are usable as fabrication techniques become available. The latter ceramic oxides have a transition temperature above the boiling point of liquid nitrogen which permits the use of less expensive and less complex refrigeration equipment as compared for helium refrigeration systems.

OPERATION OF THE INVENTION

The single FIGURE of the drawing shows a uniform array of half-wave dipoles, separated by a distance $d<(\lambda_o/2)$ where $\lambda_o$ is the center of frequency of the dipoles. The exact spacing of the dipoles and the total number of dipoles are determined from the required gain, bandwidth and side lobe magnitude using established prior art procedures and using standard array design techniques based on Chebyshev, Fourier, binomial or other polynomial criteria. Accordingly, these disclosures are not related to the invention per se and are not discussed. Although the single FIGURE shows an end-fire configuration in which the dipoles are fed with a progressive phase change $\zeta=2\pi d/\lambda_o$, the dipoles may be fed in-phase for a broadside pattern. The signal amplitude at each dipole feed point is determined by the array configuration and the particular array synthesis method, but for any synthesis method, large currents, alternating in sign between adjacent elements can be expected.

The single FIGURE of the drawing shows the array contained in an enclosure at a temperature less than the critical temperature. If the superconducting material has a critical temperature greater than 77° K., then $N_2$ gas at the boiling point of liquid $N_2$ can be used as the coolant. The antenna in this illustration is fed with a source of power at a frequency $\nu_o$ corresponding to $c/\lambda_o$ where c is the speed of light. A progressive phase shift $\zeta=2\pi d/\lambda_o$, where d is the element spacing, is applied to each dipole in succession. This is indicated by the box labeled $\phi$ between dipoles. Radiation out (24) of very high directivity exits the enclosure through the dielectric windows 22.

Although a simple linear array has been used as an illustrative example, those skilled in the art will recognize that this invention applies to 2-dimensional arrays as well as 1-dimensional arrays and to common variations thereof, e.g., Hansen-Woodyard arrays and phased arrays.

I claim:

1. A superconducting, superdirective antenna array comprising a vacuum insulated container; a plurality of uniformly spaced half-wave dipoles which are the elements of said superconductive, superdirective antenna array within said container, said uniformly spaced half-wave dipoles antenna array being fabricated from a superconductor material selected from the group of type II superconductors consisting of iridium, lead, mercury, tantalum, vanadium, a composite of niobium-tin-bronze, and superconductive alloys of the same; or a superconductor material selected from the group of superconductors consisting of refractory metal oxides which are ceramic oxides consisting of lanthanum-barium-copper oxide composition of the formula $La_{(2-x-)}Ba_xCuO_4$ wherein x is an integer and wherein said lanthanum-barium-copper oxide composition has a transition temperature in the range of about 30° K., and the refractory metal oxides which are ceramic oxides consisting of yttrium-barium-copper oxides of the formula $YBa_2Cu_3Ox$ wherein x is an integer and wherein said yttrium-barium-copper oxide composition has a transition temperature in the range of about 93° K., and the thallium-calcium-barium-copper oxide family of compounds with a transition temperature as high as 125° K.; said vacuum insulated container provided with inlet and outlet connections for coupling refrigeration gases thereto; said vacuum insulated container having an outlet for connecting to a vacuum source; electrical conductors connected to a first element of said dipole antenna array for coupling said array to a source of power at a frequency $\nu_o$ corresponding to $c/\lambda_o$ wherein c is the speed of light; and a dielectric window for directing radiation of a very high directivity from said superconducting, superdirective antenna array.

2. The superconducting, superdirective antenna array of claim 1 wherein said array is a linear array and wherein a progressive phase shift $\zeta=2\pi d/\lambda_o$ is applied to each of said dipoles in succession and wherein d is said element spacing, said antenna array element spacing being less than $\lambda_o/2$ wherein $\lambda_o$ is the center frequency.

3. The superconducting, superdirective antenna array of claim 2 wherein said uniformly spaced half-wave dipoles antenna array elements have a critical temperature greater than 77° K.

* * * * *